Dec. 27, 1966  S. H. KOHLER ETAL  3,294,129
RADIAL ARM SAW MACHINE
Filed Sept. 17, 1964  4 Sheets-Sheet 1
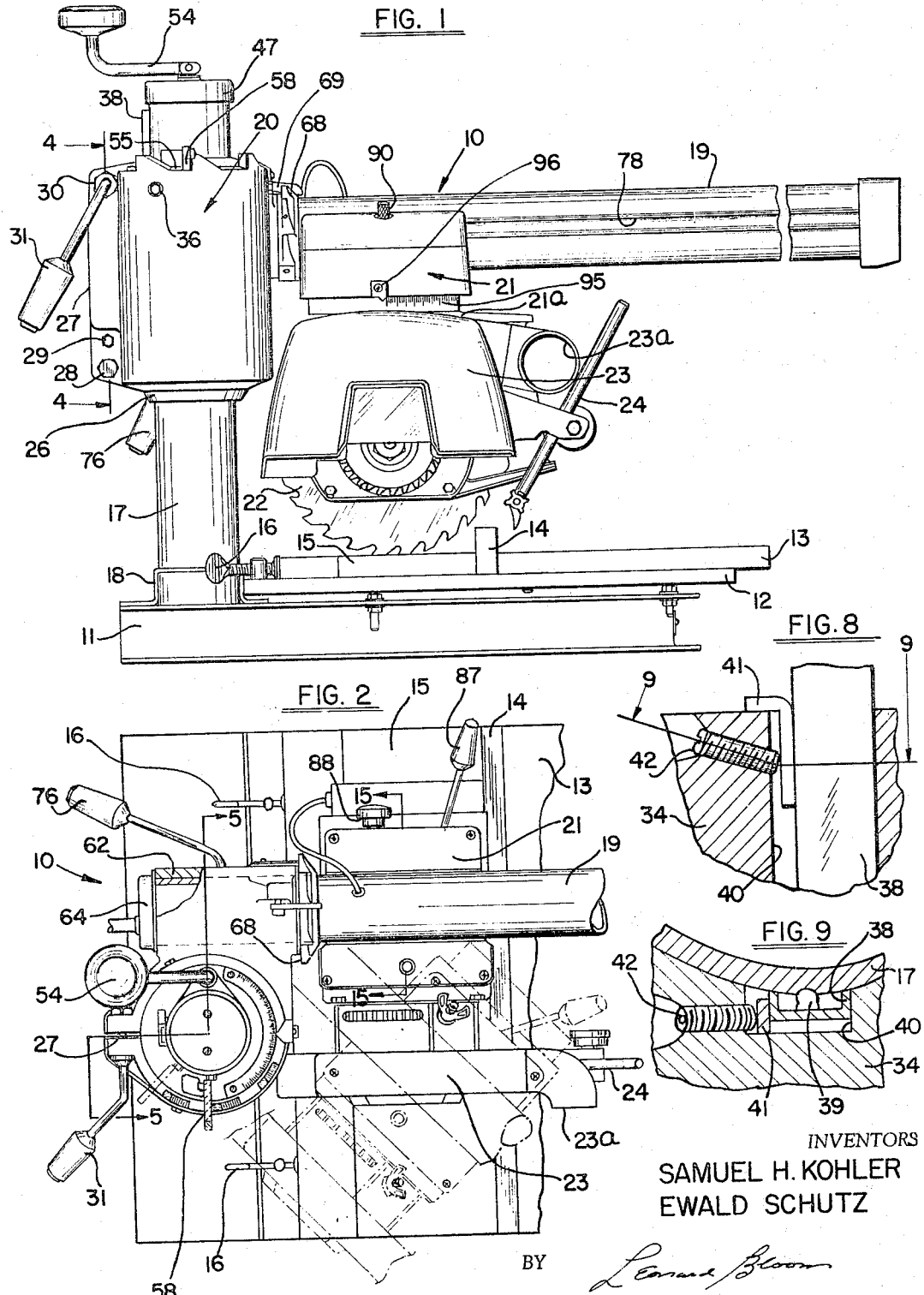
INVENTORS
SAMUEL H. KOHLER
EWALD SCHUTZ
BY Leonard Bloom
ATTORNEY Dec. 27, 1966    S. H. KOHLER ETAL    3,294,129
RADIAL ARM SAW MACHINE Filed Sept. 17, 1964    4 Sheets-Sheet 2

INVENTORS
SAMUEL H. KOHLER
EWALD SCHUTZ
BY
*Leonard Bloom*
ATTORNEY

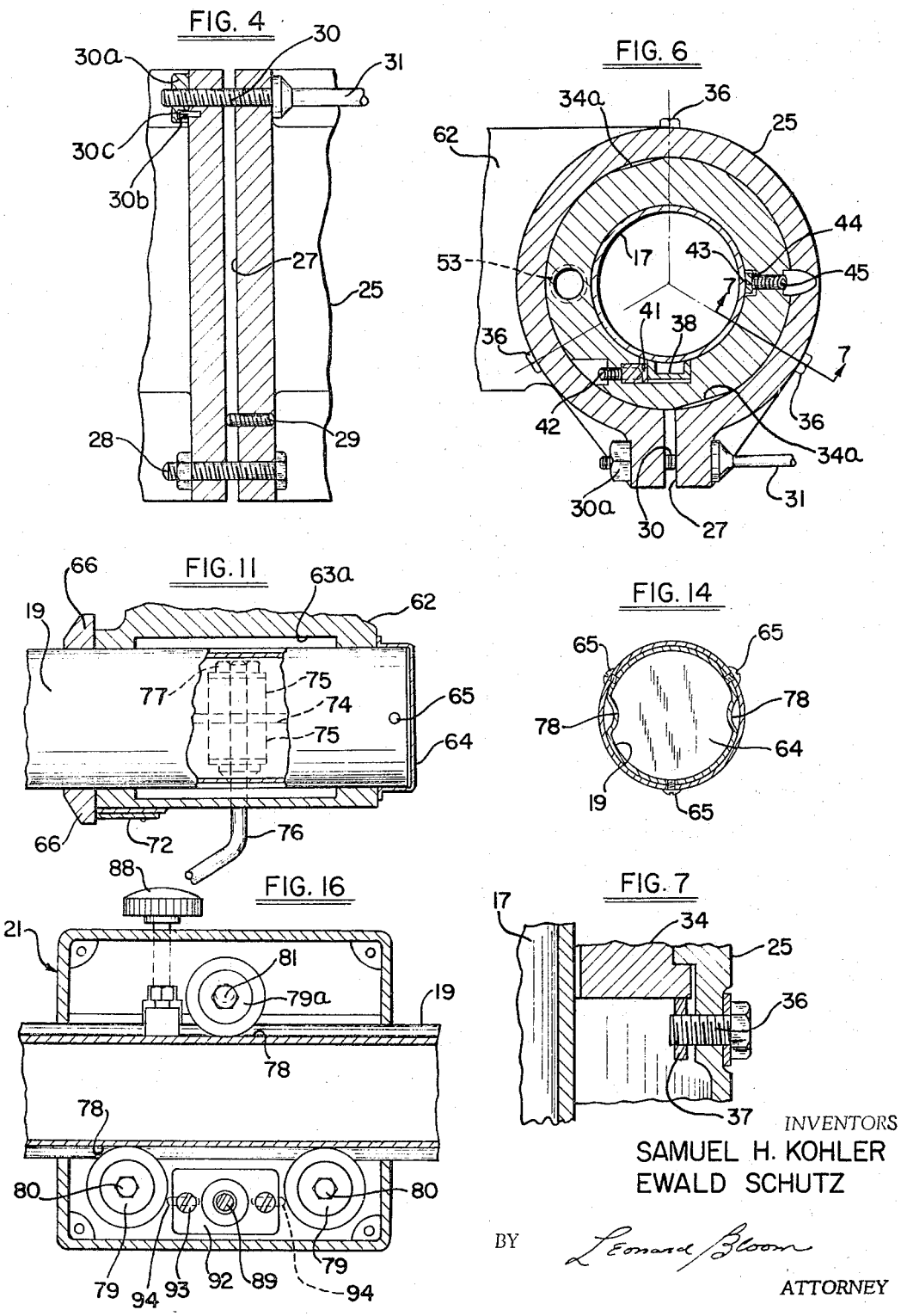

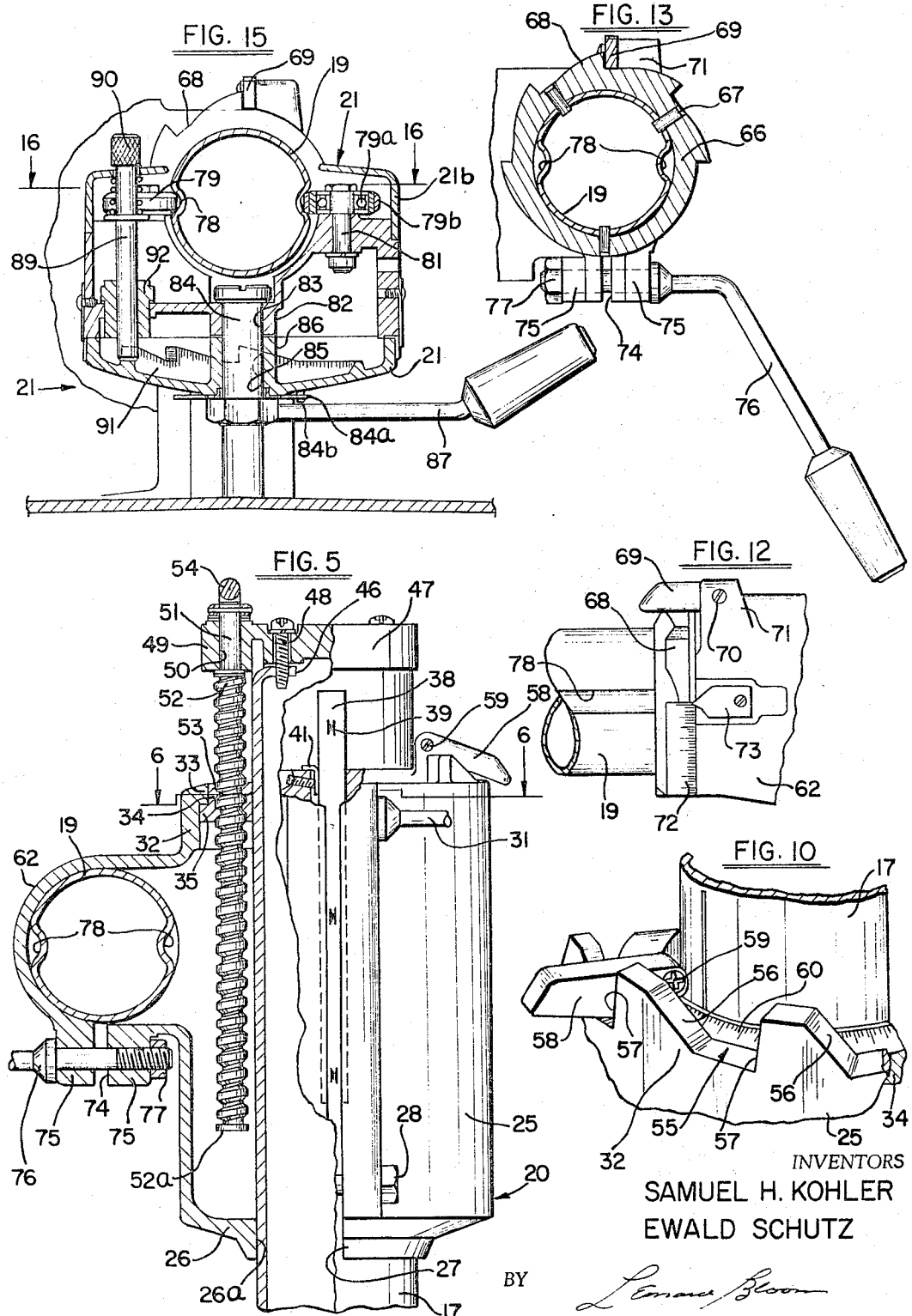

United States Patent Office 3,294,129
Patented Dec. 27, 1966

3,294,129
RADIAL ARM SAW MACHINE
Samuel H. Kohler and Ewald Schutz, Lancaster, Pa.,
assignors to De Walt, Inc., Lancaster, Pa., a corporation of Delaware
Filed Sept. 17, 1964, Ser. No. 397,100
6 Claims. (Cl. 143—6)

The present invention relates to a radial arm saw machine, and more particularly, to a compact low-cost radial arm saw machine, one which may be manufactured easily and economically, and yet one which provides a high degree of convenience and precision in order to be compatible with professional requirements.

It is an object of the present invention to provide a radial arm saw machine in which the three major conventional articulations or adjustments in the machine—namely, depth-of-cut, mitre, and bevel—are all accommodated in the structural area between the column and the arm.

It is another object to provide adjustable means to compensate for mis-alinement, tolerance accumulations, and wear between the arm and the column, thereby maintaining accuracy at a minimum of expense.

It is yet another object to provide a laterally-offset mounting for the radial arm in relation to the vertical axis of the column, thereby enhancing the compactness, convenient operation, and portability of the machine.

It is a further object to provide a radial arm that is tubular and is journaled in the machine for direct rotation about its own horizontal axis, thereby facilitating the making of a bevel cut; and this arrangement eliminates the prior art necessity for providing a complicated yoke in the saw carriage and an expensive trunion mounting between the yoke and the housing for the motor, and also, eliminates the necessity for a separate bevel "heel" adjustment.

It is a still further object of the present invention to provide a depth-of-cut adjustment means in which the column remains stationary, and in which the radial arm and a hub means between the arm and the column are raised and lowered conjointly on the stationary column; and this structure eliminates the necessity for a base or sub-base mounted on the frame to receive the lower end of a movable column, which is an expensive construction habitually resorted to in the prior art.

The present invention constitutes an improvement on a radial arm saw machine having a column, an arm extending horizontally from the upper portion of the column, and a saw carriage mounted for reciprocation on the arm. Broadly stated, the improvement comprises, in combination, a hub means between the column and the arm; means for mounting the hub means for vertical movement on the column, thereby regulating the depth of cut; means for mounting the hub means for circumferential movement about the axis of the column, thereby facilitating a mitre cut; and means for mounting the arm to the hub means for rotary movement of the arm about its own axis, thereby facilitating a bevel cut.

In accordance with the teachings of the present invention, a hub is disposed between the column and the arm; and a hub ring is disposed within the hub and is mounted to the column for vertical movement on the column. Means are provided for mounting the hub to the hub ring for a conjoint vertical movement on the column, thereby facilitating an adjustment in the depth of cut; and this means includes means for circumferentially moving the hub relative to the hub ring and about the vertical axis of the column, thereby facilitating a mitre cut. Preferably, the means for mounting the hub ring for vertical movement on the column includes an elevation screw disposed eccentrically to the vertical axis of the column and received within a tapped recess formed in the hub ring.

Moreover, the radial arm is preferably formed as a tubular member and is journaled for rotation about its own axis in a split boss formed in the hub, thereby facilitating a bevel cut. The split boss is formed with a bore having a horizontal axis which is laterally spaced in relation to the vertical axis of the column, and also, disposed on the right-hand side of the column when viewed from the front of the machine; and this offset mounting of the radial arm enables the saw carriage to be mounted for reciprocation in closer relationship to the column, hence reducing the overall length of the machine and making it more compact.

In accordance with the further teachings of the present invention, a longitudinal key is secured to the rear of the column and is received within a keyway formed in the hub ring. A first gib, backed by a set screw, is lodged in the keyway and engages the side of the key. A second gib, backed by its own set screw, is received within a pocket formed in the hub ring at substantially ninety degrees away from the keyway. This second gib bears against the column and exerts a force on the column substantially at right angles to the force exerted by the first gib, thereby providing an adjustable means to compensate for "play" caused by mis-alinement, tolerance accumulations, or wear between the column and the hub, and hence, between the column and the arm; and thus a high degree of precision is maintained at a minimum of expense.

These and other objects of the present invention will become apparent from a reading of the following specificationfi taken in conjunction with the enclosed drawings, in which:

FIG. 1 is a side elevation of the improved radial arm saw machine of the present invention;

FIGURE 2 is a top plan view thereof, the broken lines indicating an alternate position of the radial arm and saw carriage relative to the vertical axis of the stationary column for the making of the usual "left-hand" mitre cut;

FIGURE 4 is a section view, taken along the lines 4—4 of FIGURE 1, enlarged slightly over the scale of FIGURE 1, and showing the manner in which the hub is mounted on the upper portion of the column;

FIGURE 5 is a stepped section view, taken along the lines 5—5 of FIGURE 2, showing the longitudinal key secured to the column, the top cap secured to the column, the elevation screw eccentrically disposed in relation to the vertical axis of the column, and the split boss formed in the hub for journaling and clamping the tubular radial arm;

FIGURE 6 is a section view, taken along the lines 6—6 of FIGURE 5, showing the manner in which the hub is disposed within the hub ring, and further showing the gibs between the hub ring and the column;

FIGURE 7 is a detail section view, taken along the lines 7—7 of FIGURE 6, enlarged over the scale of FIGURE 6, and showing the manner in which the hub ring is mounted within the hub;

FIGURE 8 is an enlarged portion of FIGURE 5 showing the manner in which one of the gibs is engaged against the side of the longitudinal key secured on the rear of the column;

FIGURE 9 is a section view taken along the lines 9—9 of FIGURE 8;

FIGURE 10 is a fragmentary perspecitve of the hub, hub ring, and column, showing the mitre indexing means;

FIGURE 11 is a section view, taken along the lines 11—11 of FIGURE 3, and showing the manner in which the tubular radial arm is rotatably journaled within the hub for rotation about its own axis to facilitate the making of a bevel cut;

FIGURE 12 is a side elevation of a portion of FIGURE 3, showing the graduations and cooperating pointer to indicate the particular bevel adjustment;

FIGURE 13 is a section view, taken along the lines 13—13 of FIGURE 3, showing the clamping of the tubular radial arm within the split boss, and further showing the indexing means between the arm and the hub;

FIGURE 14 is a section view, taken along the lines 14—14 of FIGURE 3, and showing the mounting of the end cap on the tubular radial arm to prevent axial displacement of the arm relative to the column;

FIGURE 15 is a section view, taken along the lines 15—15 of FIGURE 2, and showing a preferred manner of mounting the saw carriage on the radial arm; and FIGURE 16 is a section view, taken along the lines 16—16 of FIGURE 15, and showing the manner in which the bearing rollers on the saw carriage cooperate with respective trackways formed in the tubular radial arm.

Figure 3:
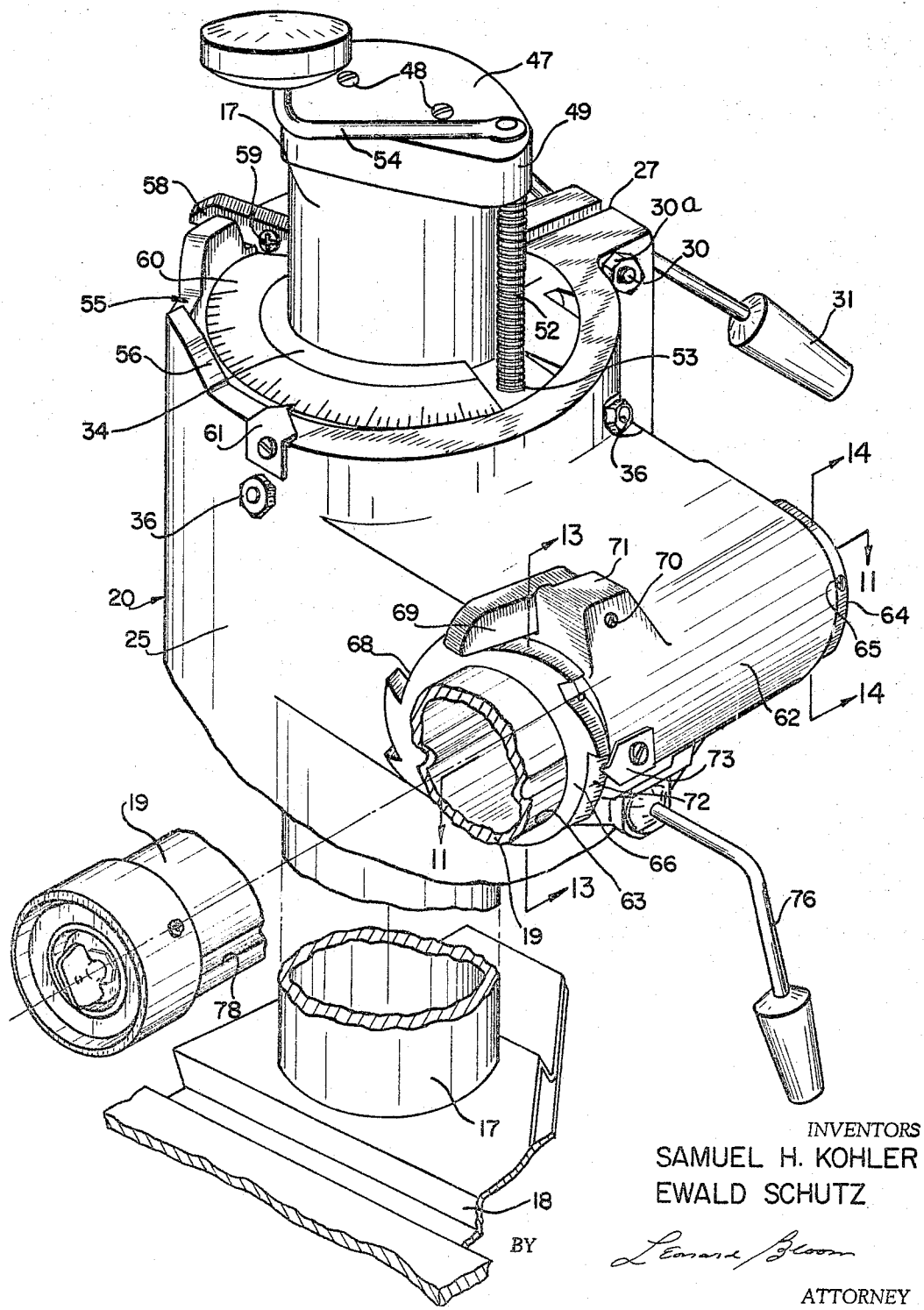
FIGURE 3 is a fragmentary perspective, drawn to an enlarged scale, and showing the column, hub ring, hub, and tubular radial arm in assembled relationship.

With reference to FIGURES 1 and 2, there is illustrated a radial arm saw machine 10 which embodies the basic teachings of the present invention and generally comprises: a base or frame portion 11 including a pair of spaced-apart cleats, one of which is shown as at 12; a work table 13 including a guide fence 14 and a removable portion 15; a pair of clamps 16 for securing the removable portion of the table against the fence; a stationary column 17 suitably retained within a bracket 18 mounted on the frame; an overhanging radial arm 19 extending substantially in the horizontal direction from the upper portion of the column; a hub means, generally denoted as at 20, between the arm and the column; a saw carriage, generally denoted as at 21, mounted for limited reciprocatory movement on the radial arm; a saw blade 22 driven by a motor in a motor housing 21a mounted beneath the carriage; a guard 23 for the blade, the guard being provided with a discharge nozzle 23a for the removal of saw dust particles and chips; and a conventional anti-kickback device 24 mounted on the saw carriage.

With reference to FIGURES 3, 4, and 5, the hub means 20 comprises a hub member 25 formed as a split casting having a lower portion 26 provided with a bore 26a which slidably engages the column. The hub 25 further has a slotted rear portion 27 which receives a first clamping screw 28, a set screw 29 bearing against a side of the slot, and a second clamping screw 30; this clamping screw 30 is provided with a clamping lever 31, commonly referred to in the art as a mitre clamp, which releasably secures the hub 25 to the column and, when released, allows the hub to be rotated circumferentially about the vertical axis of the column preparatory to the making of a mitre cut. The clamping screw 30, moreover, engages a nut 30a having a series of spaced pockets or grooves 30b which cooperate with a roll pin 30c secured to the hub. The nut 30a may be removed from the screw 30 and re-positioned such that the roll pin 30c engages a different one of the grooves 30b on the nut; and this arrangement, together with the set screw 29, takes up slack or "play" on the mounting of the hub 25 to the column, and hence compensates for misalinements, tolerance accumulation, and wear.

With reference to FIGURES 5, 6, and 7, the hub 25 is further provided with an upper portion 32 which has an inwardly-directed annular flange 33. A hub ring 34 in the form of a collar is disposed within the hub 25 and has an annular peripheral flange 35 which is seated beneath the flange 33 on the hub and abuts against it. A plurality of screws 36, preferably disposed 120 degrees apart, are received through the hub 25, see FIGURES 6 and 7, and cooperate with respective clamping nuts 37; and a respective flat side of each clamping nut 37 is lodged beneath the peripheral annular flange 35 of the hub ring 34. In such a manner, the hub ring 34 is secured within the hub 25; and it will be appreciated that the hub 25 and its hub ring 34 will have a conjoint vertical movement with respect to the column, but that the hub ring 34 will remain stationary as the hub 25 is rotated or adjusted circumferentially about the vertical axis of the column preparatory to making a mitre cut on the machine. The hub ring 34, moreover, has a pair of flats 34a, see FIGURE 6, to allow the hub ring to be tilted and received down within the upper portion 32 of the hub.

With reference again to FIGURES 5 and 6, and with further reference to FIGURES 8 and 9, a longitudinal key 38 is secured to the rear of the column; preferably, the longitudinal key 38 is channel-shaped and is projection-welded to the column by a number of "spot" welds 39. A keyway 40 is formed in the hub ring 34 to receive the longitudinal key 38. A gib 41, preferably in the form of an L-shaped brass piece, is lodged in the keyway 40 between the hub ring 34 and the key 38, see FIGURE 8, and is engaged against the side of the key by means of an angled set screw 42. Moreover, a second gib 43, also in the form of an L-shaped brass piece, is received within a pocket 44 formed within the hub ring approximately at ninety degrees from the key and its cooperating keyway; and a second angled set screw 45 is carried by the hub ring for engaging the second gib against the column. The action or force exerted by the gibs 41 and 43 is directed in two mutually-perpendicular planes, and the gibs provide an adjustable means to compensate for "play" caused by mis-alinement, tolerance accumulations, and wear between the column and the hub means, and hence, between the column and the arm; and thus a high degree of accuracy and precision is maintained together with a minimum of expense in the manufacture, assembly, and servicing of the machine.

With reference again to FIGURE 5, the top of the column 17 has a pair of lanced-out inwardly-directed tabs, one of which is shown as at 46; and a top cap 47 is secured to the column by means of screws 48 which are received within the respective tabs. The top cap 47 has a radial boss 49 with a bore 50 formed therein; and a rod 51 is rotatably journaled within the bore, but is suitably retained against axial displacement. The lower portion of the rod 51 is threaded to form a vertical elevation screw 52, which is received within a tapped recess 53 formed in the hub ring, see FIGURE 6, with the axis of the elevation screw 52 being eccentrically disposed with respect to the vertical axis of the column. The end of the elevation screw, denoted as at 25a, is non-threaded and is radially enlarged to prevent the complete withdrawal of the elevation screw out of the tapped recess 53 in the hub ring 34. An elevation crank 54 is secured to the rod, and the elevation crank may be rotated (in one direction or another) to selectively raise and lower the hub ring 34—and in turn the hub 25, radial arm 19, saw carriage 21, and blade 22—vertically with respect to the work table 13.

The clamping lever 31, see FIGURES 1 and 3 again, comprises a mitre clamp; and whenever it is loosened, the hub 25 may be rotated and circumferentially indexed about the vertical axis of the column preparatory to the making of a mitre cut, either left-hand or right-hand mitre as is desired. The annular space between the hub 25 and the column 17 provides sufficient clearance for the elevation screw 52 whenever a mitre adjustment is made on the machine. The top portion 32 of the hub 25, see FIGURE 10, is formed with a series of external notches 55. Each of these notches 55 includes a sloped ramp portion 56, in the nature of a cam surface, and a substantially-flat shoulder 57. The notches cooperate with an index member 58, in the nature of a pivoted latch, loosely mounted upon the hub ring by means of a screw 59. The index latch member 58 normally abuts against one of the shoulders 51, and the shoulders correspond to the popular mitre positions of the arm, namely, zero degrees, forty-five left-hand mitre, and forty-five right-hand mitre.

Whenever the mitre clamp 31 is loosened, the hub 25 may be rotated in the direction away from the respective shoulder 57 and abutting latch 58, such that the latch 58 rides up the adjacent ramp 56 and is automatically cammed out of the way; thereafter, the latch 58 falls down into the next succeeding notch 55, and then the hub 25 may be reversed slightly to insure an abutment between the latch 58 and the next succeeding shoulder 57 in order to automatically present the desired mitre adjustment of the machine with a minimum of effort being required on the part of the operator. If it is desired to rotate the hub 25 in the opposite direction, however, the latch 58 may be manually pivoted up out of the way to clear the shoulder prior to making the adjustment; and then the latch may be allowed to fall down into the next desired one of the notches. In this manner, the indexing means is "uni-directional." Moreover, the hub 25 may be clamped at any intermediate position as indicated by a graduation scale 60 on the hub ring 34 and a cooperating pointer 61 carried by the hub 25.

The structure and function of the index latch 58 and cooperating notches 55 form no part of the present invention, but are described and claimed in the copending Cassey application Serial No. 397,239, filed September 17, 1964, entitled "Uni-Directional Indexing Means for Power-Operated Machine," and assigned to the assignee of the present invention.

With reference again to FIGURE 3, and with further reference to FIGURES 11–14, the hub 25 includes an integrally-formed split boss portion 62 provided with a through bore 63. The axis of the bore 63 is horizontally disposed, but is laterally offset with respect to the vertical axis of the column, and preferably, is disposed on the right-hand side of the column when viewed from the front of the machine. The radial arm 19 is formed as a tubular member and is journaled within the bore 63 of the split boss 62. Preferably, the bore 63 has an annular undercut 63a, so as to provide two spaced annular bearing surfaces to journal the arm. An end cap 64, see FIGURE 14, is secured to the rear of the tubular radial arm 19 by means of a plurality of screws 65. A collar 66, see FIGURE 13, is secured to the arm (at the opposite side of the split boss) by means of a plurality of roll pins 67. The split boss 62 with the bore 63, in combination with the end cap 64 and collar 66, provides a journal for rotatably supporting the tubular radial arm in the hub 25 in order to facilitate the making of a bevel cut, yet precludes an axial displacement of the arm relative to the hub. The periphery of the collar 66 is provided with a series of notches 68, much in the nature of the notched upper portion 32 of the hub 25; and these notches 68 cooperate with a bevel index latch 69, which is pivoted on a screw 70 received in a boss 71 formed integrally on the split boss portion 62 of the hub.

As previously described for the mitre articulation, the cooperating latch 69 and notches 68 on the periphery of the collar 66 provide a bevel indexing means between the tubular radial arm 19 and the hub 25, the arm rotating about its own axis preparatory to making a bevel cut. The indexing means provides the usual zero bevel position, forty-five and ninety left, and forty-five and ninety right. Moreover, the arm may be clamped in any intermediate position; and for this purpose, a scale 72 is carried by the collar 66 and cooperates with a pointer 73 mounted on the boss.

The lower portion of the boss 62, is slotted as at 74, see FIGURE 13 again, and a pair of depending ears 75 are formed on the boss and receive a clamping lever 76 which is provided with a lock nut 77. The clamping lever 76 comprises the bevel clamp, and releasably secures the tubular arm 19 against rotation in the hub.

With reference to FIGURES 15 and 16, the tubular radial arm 19 has a pair of parallel guideways or trackways 78 formed therein, one on each side of the arm; and the saw carriage 21 is provided with three bearing rollers, two of which, 79, are disposed on one side of the arm, and the third of which, 79a, is disposed on the other side of the arm intermediately of the other two. The bearing rollers 79 and 79a are provided with annular adapters or "shoes" 79b, see FIGURE 15, which cooperate with the respective trackways 78 in the arm to slidably support the carriage on the arm. The bearing rollers 79 are mounted on respective stub shafts 80; and preferably, the bearing roller 79a is eccentrically mounted on its own stub shaft 81, so that the position of the three bearing rollers may be adjusted in relation to the trackways 78 in order to compensate for misalinements, tolerance accumulations, and wear between the carriage and the arm.

With reference again to FIGURE 15, the motor housing 21b is swivel-mounted beneath the carriage 21. The carriage is provided with a central boss 82 having a bore 83 which journals a "king" bolt 84, the lower portion of which is keyed within a bore 85 in a boss 86 formed in the motor housing 21a. The king bolt 84 is coupled to a clamping lever 87, and a "spider" washer 48a has a series of pockets to cooperate with a cast-in projection 84b in the housing, thereby providing a take-up or adjustment means between the king bolt 84 and the clamping lever 87. The clamping lever 87 is referred to in the art as a rip clamp; and whenever the rip clamp is released, the motor housing 21a may be swiveled about the vertical axis of the king bolt 84 and indexed in a ninety degree position preparatory to the making of a rip cut. For this purpose, the saw carriage 21 is further provided with a clamp 88 for securing the entire saw carriage at a desired adjusted position along the radial arm 19. Moreover, a spring-loaded index pin 89, formed with a knurled portion 90, is provided in the carriage 21; and the index pin 89 cooperates with a notched plate 91, preferably similar to the notched collar 66, for indexing the motor housing, and hence the saw blade, about the vertical axis of the king bolt. As shown in FIGURE 1, the swiveled position of the motor housing 21b is indicated by a scale 95 and pointer 96.

Moreover, as shown in FIGURE 16, the index pin 89 is carried in a block 92 which is secured to the saw carriage by screws 93. The screws 93 pass through elongated slots 94 in the block, and thus the block is adjustably mounted for insuring that the motor housing and hence the saw blade is true in relation to the trackways in the radial arm. This provides a "heel" adjustment and insures that the rear portion of the blade will not cut into the work as the carriage slides along the arm. This insures a clean, smooth cut with uniform (and minimum) kerf thickness. Moreover, inasmuch as the axis of the radial arm and the bevel axis are one and the same, no separate bevel "heel" adjustment is necessary; and this is an important advantage of the present structure.

Obviously, many modifications may be made without departing from the basic spirit of the present invention; and accordingly, within the scope of the appended claims, the invention may be practiced other than has been specifically described herein.

We claim:

1. In a radial arm saw machine having a stationary column, an arm extending horizontally from the upper portion of the column, and a saw carriage mounted for reciprocation on the arm; the improvement which comprises:

(a) a hub between the column and the arm;
    (b) a hub ring within said hub;
    (c) means mounting said hub ring to the column for vertical movement of said hub ring on the column;
    (d) means mounting said hub to said hub ring for a conjoint vertical movement on the column, thereby facilitating an adjustment in the depth of cut;
    (e) said last-named means including means for circumferentialy moving said hub relative to said hub ring and about the axis of the column, thereby facilitating a mitre cut, and comprising:
- (1) an internal annular flange formed on the upper portion of said hub;
- (2) a cooperating annular peripheral flange formed on the lower portion of said hub ring, whereby when said hub ring is seated within said hub, said cooperating flanges abut one another; and
- (3) fastening means passing radially through said hub and including a member within said hub and lodged against the bottom of said peripheral flange on said hub ring; and (f) means mounting the arm to said hub for rotary movement of the arm about its own axis, thereby facilitating a bevel cut.

2. In a radial arm saw machine having a stationary column, an arm extending horizontally from the upper portion of the column, the arm being substantially cylindrical and tubular, and a saw carriage mounted for reciprocation on the arm; the improvement which comprises:
- (a) a hub between the column and the arm;
- (b) a hub ring within said hub;
- (c) means mounting said hub ring to the column for vertical movement of said hub ring on the column;
- (d) means mounting said hub to said hub ring for a conjoint vertical movement on the column, thereby facilitating an adjustment in the depth of cut;
- (e) said last-named means including means for circumferentially moving said hub relative to said hub ring and about the axis of the column, thereby facilitating a mitre cut; and
- (f) means mounting the arm to said hub for rotary movement of the arm about its own axis, thereby facilitating a bevel cut, comprising:
  - (1) a boss formed integrally with said hub and extending laterally therefrom to one side of the column;
  - (2) said boss having a central bore formed along a substantially horizontal axis which is spaced in relation to the vertical axis of the column, whereby the arm is journaled in said bore of said boss, and whereby the compactness of the machine is enhanced by the offset mounting of the arm relative to the column;
  - (3) a pair of spaced-apart collars secured to the arm on respective sides of said boss, whereby the arm is retained against axial movement out of said boss;
  - (4) indexing means between one of said collars and said boss;
  - (5) said boss having a lowermost split portion; and
  - (6) clamping means engaging said split portion for selectively securing the arm against rotation in said boss.

3. In a radial arm saw machine having a stationary column, an arm extending horizontally from the upper portion of the column, and a saw carriage mounted for reciprocation on the arm; the improvement which comprises:
- (a) a hub between the column and the arm;
- (b) a hub ring within said hub;
- (c) means mounting said hub ring to the column for vertical movement of said hub ring on the column;
- (d) keying means between said hub ring and the column; said keying means comprising:
  - (1) a longitudinal key secured to the rear of the column parallel to the axis of the column; and
  - (2) a keyway formed in said hub ring to receive said key;
- (e) means compensating for misalinement and wear between said hub ring and the column; said means comprising:
  - (1) a first gib between said longitudinal key and a side of said keyway in said hub ring;
  - (2) a set screw carried by said hub ring and engaging said first gib against said key;
  - (3) a second gib received in a pocket formed in said hub ring substantially at right angles to said first gib; and
  - (4) a second set screw carried by said hub ring and engaging said second gib against the column;
- (f) means mounting said hub to said hub ring for a conjoint vertical movement on the column, thereby facilitating an adjustment in the depth of cut;
- (g) said last-named means including means for circumferentially moving said hub relative to said hub ring and about the axis of the column, thereby facilitating a mitre cut; and
- (h) means mounting the arm to said hub for rotary movement of the arm about its own axis, thereby facilitating a bevel cut.

4. In a radial arm saw machine, the subcombination of:
- (a) a column;
- (b) a hub ring closely fitted externally about the column, and keyed thereto, for vertical sliding movement thereon;
- (c) an elevation screw carried by the column, eccentrically to the axis thereof, and received within a tapped recess formed within the hub ring, thereby mounting the hub ring for vertical movement on the column;
- (d) a hub comprising a hollow casting substantially surrounding an axial portion of the column, the hub casting and column defining a continuous annular space therebetween, thereby providing clearance for the elevation screw;
- (e) the hub casting having a top flanged portion supported on a cooperating flange formed on the hub ring, whereby the top portion of the hub casting is rotatably supported on the hub ring, and whereby the hub ring is nested within the top portion of the hub casting;
- (f) means keying the hub casting to the hub ring for conjoint vertical movement on the column;
- (g) the hub casting having a lower integral portion, extending below the lower end of the elevation screw, and having a bore formed therein for rotatable bearing support directly on the column;
- (h) the hub casting further having a bore formed therein along a horizontal axis; and
- (i) a tubular arm journaled in the bore for rotation about its axis, said arm having means cooperating with the hub casting to prevent axial displacement of the arm out of the casting.

5. A radial arm saw machine, comprising:
- (a) a column;
- (b) a hub comprising a hollow casting substantially surrounding an axial portion of the column, the hub casting including a vertically split portion;
- (c) a hub ring nested within the hub casting, the ring being keyed to the column;
- (d) adjustable means mounting the hub ring to the column for selective raising and lowering movement thereon, thereby facilitating an adjustment in the depth of cut;
- (e) means mounting the hub casting to the hub ring for a conjoint vertical movement on the column, said last-named means including means for circumferential movement of the hub casting relative to the hub ring and about the column, thereby facilitating a mitre adjustment;
- (f) circumferentially-spaced positive indexing means between the hub casting and the hub ring;
- (g) selective clamping means operative through the vertically split portion of the hub casting for securing the hub casting in its adjusted circumferential position relative to the column;

(h) the hub casting having a bore formed therein along a horizontal axis, and further having a horizontally split portion radially of the bore;
(i) an arm journaled for rotation within the bore, thereby facilitating a bevel adjustment;
(j) circumferentially-spaced positive indexing means between the arm and the hub casting;
(k) selective clamping means operative through the horizontally split portion of the hub casting for securing the arm in its adjusted rotated position relative to the hub casting; and
(l) a saw carriage on the arm.

6. A radial arm saw machine, comprising:
(a) a column;
(b) a hub ring adjustably mounted for vertical movement on the column;
(c) a hub comprising a hollow casting mounted on the hub ring for conjoint vertical movement on the column, thereby facilitating an adjustment in the depth of cut;
(d) the hub casting being adjustable circumferentially relative to the hub ring, about the column and selectively secured thereto, thereby facilitating a mitre adjustment;
(e) a lateral boss on the hub casting;
(f) the boss having a through bore formed therein along a horizontal axis which is in a plane offset from a parallel plane passing through the column, thereby enhancing the front-to-back compactness of the machine;
(g) cylindrical arm journaled for rotation in the through bore, extending beyond the hub, and retained against axial displacement therefrom;
(h) means selectively securing the cylindrical arm to the lateral boss in its selected rotated position, thereby facilitating a bevel adjustment; and
(i) a saw carriage slidably mounted on the arm.

References Cited by the Examiner

UNITED STATES PATENTS

| 1,528,535 | 3/1925 | De Walt | 143—6 |
| 1,850,773 | 3/1932 | Rueger | 143—6 |
| 2,022,288 | 11/1935 | Knapp | 143—6 |
| 2,367,461 | 1/1945 | Emmons | 143—6 |
| 3,104,687 | 9/1963 | Field | 143—6 |

FOREIGN PATENTS 806,663  12/1958  Great Britain.

DONALD R. SCHRAN, *Primary Examiner.*